J. A. & E. E. SOWELL.
BALL BEARING LOCK NUT.
APPLICATION FILED JAN. 8, 1917.

1,263,910.

Patented Apr. 23, 1918.

WITNESS
Bernard Privat

INVENTORS
John A. Sowell & Ernest E. Sowell
BY
Berar G Webster
ATTORNEY

UNITED STATES PATENT OFFICE.

JOHN A. SOWELL AND ERNEST E. SOWELL, OF SACRAMENTO, CALIFORNIA.

BALL-BEARING LOCK-NUT.

1,263,910.   Specification of Letters Patent.   Patented Apr. 23, 1918.

Application filed January 8, 1917. Serial No. 141,117.

*To all whom it may concern:*

Be it known that we, JOHN A. SOWELL and ERNEST E. SOWELL, citizens of the United States, residing at Sacramento, in the county of Sacramento, State of California, have invented certain new and useful Improvements in Ball-Bearing Lock-Nuts; and we do declare the following to be a full, clear, and exact description of the same, reference being had to the accompanying drawings, and to the characters of reference marked thereon, which form a part of this application.

This invention relates to improvements in lock nuts. The object of this invention is to produce a nut which, when it is mounted upon the bolt cannot of itself creep backwardly off the bolt. All nuts of the types now commonly used will shake loose on the bolt and away from the parts held together by the bolt due to the vibration of the machinery or other elements to which bolts and nuts may be applied. This is due to a very large degree to the fact that the surface against which the nut impinges is rough and the inner face of the nut is usually rough and these two rough surfaces working against each other tend to act as a driver to drive the nut backwardly from the bolt and thus loosen it. This we intend to overcome by having first a socketed washer which fits over the bolt and impinges against the parts to be bolted, the socket being made perfectly smooth and true. We then provide the lock nut having one of its parts formed into a half ball shape which half ball shape fits into this socketed washer. The face of this half ball shaped portion of the nut is likewise made perfectly smooth and true so that when it fits in the socketed washer there will be perfect ball bearing contact between the two with no possibility of any rough surfaces engaging each other. Thus the objection that the rough surfaces drive against each other and tend to loosen the nut will be removed. The lock nut proper is then formed of such structure that it will not itself tend to creep off of the bolt but will be held in a positive fixed position thereon by means of the structure as herein shown.

A further object of the invention is to produce a simple and inexpensive device and yet one which will be exceedingly effective for the purposes for which it is designed.

These objects we accomplish by means of such structure and relative arrangement of parts as will fully appear by a perusal of the following specification and claims.

In the drawings similar characters of reference indicate corresponding parts in the several views.

Figure 1:
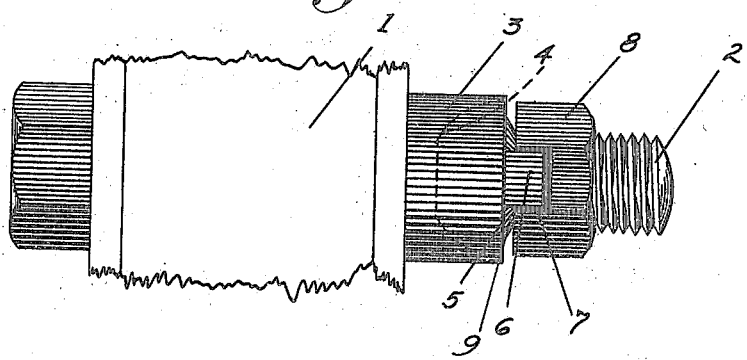
Figure 1 is a side elevation of the bolt and our improved ball bearing lock nut as they appear when mounted one upon the other.
Figure 2:
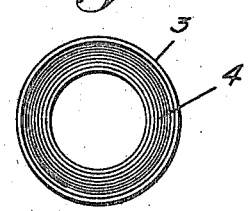
Fig. 2 is a face view of the socketed washer.
Figure 3:
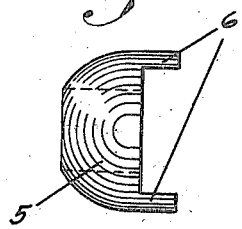
Fig. 3 is a complete side view of the ball bearing portion of the lock nut.
Figure 4:
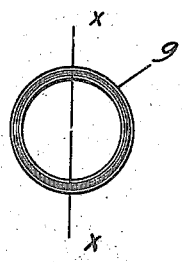
Fig. 4 is a front elevation of the spring lock washer.
Figure 5:
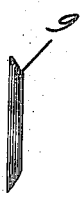
Fig. 5 is a sectional view taken on a line X—X of Fig. 4.
Figure 6:
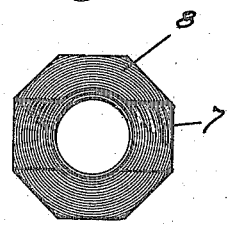
Fig. 6 is a face view of the nut proper showing the recesses to receive the lugs shown in the part depicted in Fig. 3.

Referring now more particularly to the characters of reference on the drawings the numeral 1 designates the parts which may be bolted together which may of course be any form of mechanical or other structure. The numeral 2 designates the bolt.

The numeral 3 designates the socketed washer which is provided in its outer face with a cup shaped socket 4. The numeral 5 designates the ball bearing portion of the lock nut the inner face of which is formed in a substantial half ball shape arranged for smooth engagement in the socket 4. This member 5 is threaded so that it can be screwed upon the bolt and is provided on its outer face with a pair of projecting lugs or finger members 6. These finger members 6 are adapted to be projected in recesses 7 in the outer sides of the nut 8. These recesses 7 are of a slightly greater width than the lugs 6 for a purpose which will presently appear.

The numeral 9 designates the frusto-conical spring washer arranged to fit over the bolt 2 and between the lug 6 and to bear with spring contact between the members 5 and 8.

When the nut is to be mounted upon the bolt the washer 3 is first placed over the bolt and against the parts 1 with its recess 4 facing outwardly. The washer 9 is then placed between the lugs 6 and the lugs 6 are then placed within the recesses 7 and the members 5 and 8 are then screwed upon the bolt as a unit. They are then advanced upon the threads until the ball bearing member 5 fits closely in contact with the socket 4 and the entire device is then tightened up to the desired degree.

The ball bearing feature as already shown prevents any of the direct vibration of the bolted parts from tending to loosen the nut 5. Since the nut 5 cannot in itself tend to loosen and since it is held in connection with the nut 8 this likewise prevents the nut 8 from loosening except to an amount equal to the difference in the width of the lugs 6 and the recesses 7. This difference between the lugs 6 and the recesses 7 will allow the nut to be tightened up against the pressure of spring washer 9 which will hold the nut 8 against the threads of the bolt 2.

The distance between the members 5 and 8 is fixed by the thickness of the spring 9 and leaves a thread or two of the bolt exposed and as in the course of time these threads become more or less filled with the deposits of dirt this further prevents the member 5 from attempting to back up upon the bolt and by reason of its connection with the nut 8 said nut 8 is likewise prevented from backing up upon the bolt.

From the foregoing description it will be readily seen that we have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claims.

Having thus described our invention what we claim as new and useful and desire to secure by Letters Patent is:

1. The combination with a bolt, of an independent washer mounted on the bolt and adapted to abut against the adjacent bolted part, the washer being provided with a semispherical socket, a nut threaded on the bolt and having no locking connection with its adjacent parts, such nut having a semispherical head fitting into the socket, the bearing surfaces between the head and socket being smooth whereby the vibration of the washer will not tend to loosen the nut.

2. A lock nut comprising a socketed washer, a nut member formed in a half ball shape and arranged to fit in the washer and a nut proper connected with the first nut member, with a spring washer interposed between the two.

3. A lock nut comprising a socketed washer and nut member of half ball shape arranged to fit the socket, a nut proper provided with recesses the first named nut member having lugs projecting into the recesses, the width of the recesses being slightly greater than the width of the lugs whereby the nut proper may have a slight turning movement independently of the first named nut member, and a spring washer interposed between the two.

4. A lock nut comprising a socketed washer and nut member of half ball shape arranged to fit the socket, a nut proper provided with recesses the first named nut member having lugs projecting into the recesses, and a spring washer interposed between the nut member and the nut proper.

In testimony whereof we affix our signatures.

JOHN A. SOWELL.
ERNEST E. SOWELL.

Copies of this patent may be obtained for five cents each, by addressing the "Commissioner of Patents, Washington, D. C."